May 24, 1966 R. B. BUONAIUTO 3,253,064
PROCESS OF MOLDING A FOAMED PLASTIC
HAVING AN OUTERMOST UNIFORM SKIN
Filed April 17, 1962 8 Sheets-Sheet 1

INVENTOR.
ROBERT B. BUONAIUTO

BY Kenwood Ross
ATTORNEY.

May 24, 1966  R. B. BUONAIUTO  3,253,064
PROCESS OF MOLDING A FOAMED PLASTIC
HAVING AN OUTERMOST UNIFORM SKIN
Filed April 17, 1962  8 Sheets-Sheet 2
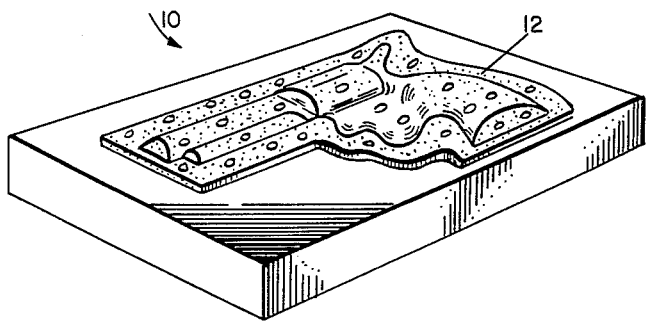
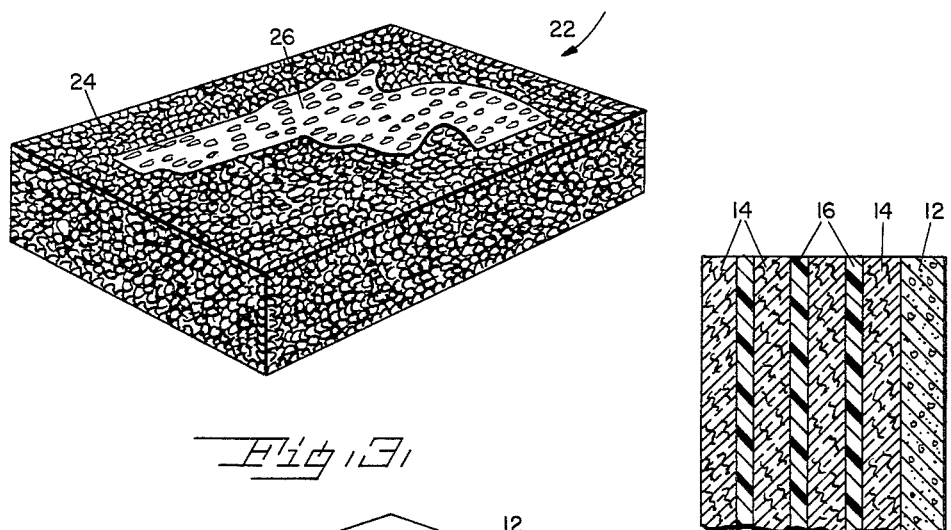
INVENTOR.
ROBERT B. BUONAIUTO
BY
ATTORNEY.

INVENTOR.
ROBERT B. BUONAIUTO
BY Kenwood Ross
ATTORNEY.

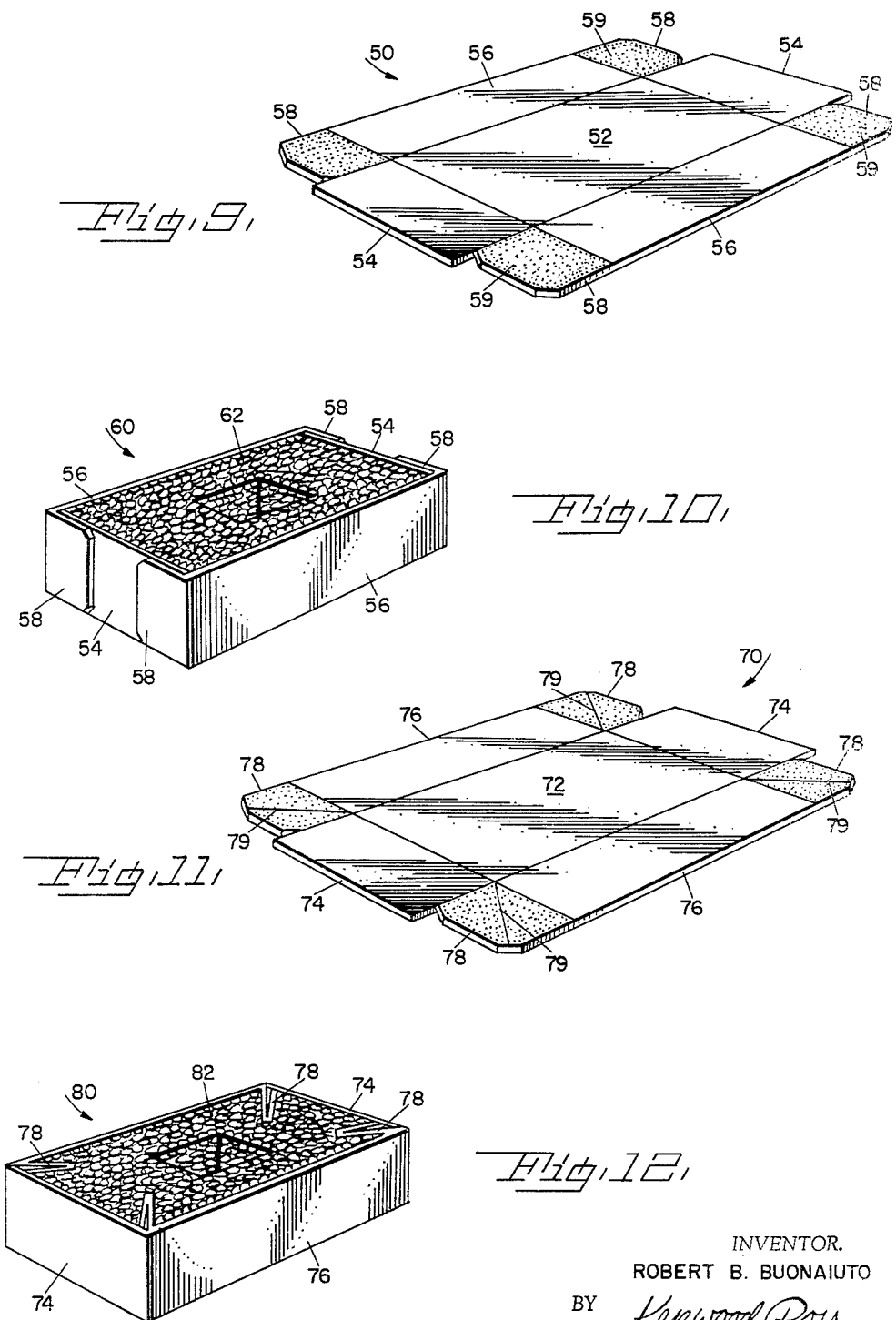

May 24, 1966 R. B. BUONAIUTO 3,253,064
PROCESS OF MOLDING A FOAMED PLASTIC
HAVING AN OUTERMOST UNIFORM SKIN
Filed April 17, 1962 8 Sheets-Sheet 6

INVENTOR.
ROBERT B. BUONAIUTO
BY Kenwood Ross
ATTORNEY.

3,253,064
PROCESS FOR MOLDING A FOAMED PLASTIC HAVING AN OUTERMOST UNIFORM SKIN
Robert B. Buonaiuto, 138 Berkshire Ave., Springfield, Mass.
Filed Apr. 17, 1962, Ser. No. 188,167
1 Claim. (Cl. 264—26)

My invention relates generally to the art of packing of packaging articles, objects and materials of various kinds for transportation, preservation, storage, and/or other purposes, and it is a primary object hereof to provide simple, practical and dependable means for packaging articles or materials which may be fragile or delicate and may easily damage, such as objects and materials requiring special packing and protection for purposes of shipping, storing, and/or preserving same.

The conventional procedures for packaging such articles and materials have normally involved the construction of special boxes and the use therewithin of soft yielding packing materials, such as excelsior, shredded paper, and the like, which practices are expensive and time consuming and may involve additional procedure, for example, the nailing of the boxes resulting in endangerment to the objects or materials therewithin.

It is a primary object of the instant invention to provide packing means and procedures which will protect the article or material being packed from heavy shock or low amplitude vibration or other potentially damaging treatment by the provision of a specially-formed cellular or foamaceous body of selected dimensions and configuration and offering a capacity to provide adequate thermal, shock, impact, vibration, and fluid-impervious insulation for said article or material.

As is known, a variety of thermoplastic polymeric and resinous materials, such as polystyrene, may be expanded or foamed from a granular or bead or pellet form to assume a porous, cellular, solidified foam-like structure by the action of a propellant or blowing agent (a gas generating substance or a fugacious liquid) incorporated therein and which expands the said granules or beads or pellets under the application of heat by causing the propellant or blowing agent to be released or thermally expanded (or both) whilst the thermoplastic material softens as it attains a foaming temperature wherefor the pressure of the thermally expanding blowing agent expands it into the desired foam structure, the heat energy required to soften the resinous material and to release the blowing agent for the foam forming function being conventionally derived from an externally generated source of heat.

Basically, my invention comprehends an improved method for expanding or foaming such thermoplastic resinous materials into molded shapes and to the formed articles thereby obtained, said articles having not only a uniform core of cellular polymeric or foam plastic material but also an outermost skin or surface which is equally uniform.

Heretofore, it has not always been possible to get good fusion upon the outer surfaces or edges and at the corners so as to impede deleteriously the advancements made in this art. Such experimentation as has been conducted to date has led only to a consistent problem in the crumbling of the beads at the outer surface wherefore they exhibit aggravating tendencies to fall away from the formed product.

Heretofore, experimentation has been conducted using molds made of glass, propylene and epoxy but the exasperating result has been that a good outer skin formation, free of formation, has been difficult, if not impossible to obtain, and this for the reason that it has not been possible to achieve proper surface temperature with plastics or other non-conductive materials, so as to make it impossible to bring the temperature of the mold up to the appropriate level.

The invention hereof, contrariwise teaches the system and means for making composite structures comprising a foamed cellular polymeric material which is provided with a smooth uniformly-formed outer skin, and in certain forms of the invention comprehends a supplemental outer covering member coacting with the foamed article so as to form a complete package.

Additionally, this invention envisions a process for fusing material through the use of a high frequency field so as effectively to provide an end product in the form of a packing or package incorporating a body of cellular or foamaceous plastic material functioning to cradle and support the article or articles to be packaged, and in certain variations herein illustrated, the body will be envisioned as comprising a foamed body combined with an outer covering member, said body and member preferentially having dissimilar physical characteristics and being so related as, in one form, to be directly bonded together and as, in another form, to be readily separable from each other.

In the expanding of such material, it has been normal procedure to preexpand the pellitized or headlike reactant mixture to a certain desired density and then to allow the preexpanded beads to aspirate over a period of hours so as to permit the equalization of pressures within the mass thereafter to charge or otherwise introduce a supply of said preexpanded and aspirated pellets into the cavity of an aluminum or like mold receivable within a press, and then to introduce steam into said cavity to produce increased temperature conditions within the confined area and to induce the pellet expansion into a fused body mass conforming to the cavity configuration, the formed molded part subsequently being cooled and ejected from the mold cavity.

In this connection, I have discovered that a main desideratum toward achieving the uniform degree of foaming within and at the outside of the foamed article, as earlier referred to, is to ensure the presence of moisture around each pellet before or preceding the entry into the RF field so as to induce the creation, uniformly, of steam.

To this end, I have determined that a wetting agent, of the commercially available types, aids in breaking down the water tension wherefor the water is enabled to flow and spread out more uniformly. Contrariwise, I have further determined that the use of water alone is not sufficient in order to circumvent the major difficulties with which this invention is concerned.

Now, admittedly, others have introduced wetting agents or other additives in attempts to achieve this desirable moisture distribution condition. Certain salts have been advantageously employed but have been objectionable from the standpoint that, while increasing the power factor, they have been found to limit the permissible voltage. The amount of water required to be effective has proved to be far in excess of the B.t.u. requirement for fusion, wherefor the dielectric solutions have, in effect, imposed a cooling burden upon the material. Too, the larger the bead, the more the water required as an inverse function of the density. To circumvent the current drain in the mold wall section, still more water was required, thus making the cooling cycle even longer.

More especially, I have determined that in these prior art developments there has been a lack of surface fusion which is directly resultable from the fact that the inner or cavity defining walls of the molds used have been unbelievably cold wherefore, in essence, steam was being generated electronically in occlusion, instead of by induction from an external source, so as to preclude perfect fusion, particularly at the outermost surfaces of the foamed article.

This much I do know: that the wetting agents or additives employed must be completely compatible with the polystyrene and water, must have an unusually high loss factor, must be required in very small quantities, must be easily added to the beads (preferably during prefoaming), must be inexpensive, must be easy mold filling, must be readily and economically available, must heat effectively at low frequencies, must be capable of impregnating the beads, and must be arc resistant, all properties which may have to be comprised as the number of chemicals and chemical combinations meeting these requirements are exasperatingly few.

One salient object of this invention is to provide a novel article having a predetermined shape and a process for the production thereof, which article has a core of cellular polymeric structure and an outer surface of uniform, tight, and non-crumbly characteristics, which outer surface may be covered with a member whose characteristics differ from the characteristics of the core, by a system which does not involve any additional handling of the article or mold, as the invention envisions the placement of a quantity of foamable or expandable polymeric material within a shell or blank subsequently constituting the said covering member, thereafter placing the shell or blank and the foamable material in the mold, and expanding or foaming the said polymeric material to produce an article offering a skin or the said different material and a core of the said cellular polymeric material, the foaming or expansion of the foamable or expandable material forcing the said different material and the foamable material to conform to the shape of the mold wherefore the said different material ultimately comprises the skin of the formed article or end product.

Various types of means have been suggested for the application of heat energy upon the beads to cause same to expand. Hot air and hot water have been used, but such treatments are limited in their commercial applications, particularly with respect to time as it sometimes takes several hours to produce the foamed polymeric materials. Infrared rays have also been used, but there is a tendency here to overheat one side of the bead, thereby inducing the collapse of the foamed structure and unevenly increased density, the heated side having a high density and the unheated side having a low density. Difficulties are also encountered when an effort is made to form the foamed structure in situ.

The use of steam as the form of heat energy to promote expansion of the beads is probably the most commonly accepted means employed at the moment. However, there are limitations in a steam process which have yet to be overcome. When the foam structure is formed in situ with facing materials, it is difficult to provide a uniform heating of the expandable particles, leading to insufficient and/or non-uniform expansion and poor fusion of the polymeric foam. The resulting foam structure may be produced with other undesirable features and marks of poor quality, often the case even when the heat supplying means are passed internally within the material being foamed, as when steam probes and the like are utilize in foam molding apparatus. Additionally, the requisite foam producing and foam molding apparatus is relatively complex, inconvenient to handle and expensive to construct and operate, often because of certain included features which are designed to facilitate the steam heating of the thermoplastic resinous material being expanded. Furthermore, steam molding comprehends the employment of a press of great clamping force, the basic instrument of success, involving great expense depending on the dimensions of the mold area and its automated features. Added testimony to the enormity of the mold problem is the fact that the commonly employed large aluminum molds must be heated to temperatures approximating 230° F. and alternately cooled to temperatures approximating 90° F. in each operating cycle, with cooling representing the greatest part of the molding cycle (averaging 2–3 minutes although extremes of 5 minutes are not uncommon).

Not always the most obvious factor in a successful steam molding operation is the maintenance of a well engineered steam distribution system stressing an ability to handle surges and a minimum proclivity among operating instrumentalities for occluded moisture. Depending upon end use, drying periods up to days, if not weeks, are not unknown.

The palpable economic deficiencies in the steam molding art, particularly in the instance of limited production runs, are manifest in limited production, long production cycles, high mold investment, long mold delivery periods, large press equipment, large boiler equipment (whether gas or oil fired), and the high cost of steam per unit production, consistently so offsetting the advantageous feature of a low cost of raw material that markets are frequently found wanting.

For these reasons, radio frequency molding has loomed attractive and it is, accordingly, among the salient objects of the instant invention to provide an improved method and means for expanding thermoplastic resinous materials thereby.

Unfortunately, polystyrene and the related expandable polymeric materials approach in varying degrees the ideal dielectric. Since they are virtually transparent to the power applied to them by high frequency waves, they cannot always be heated to their melting point in a high frequency field. Nevertheless, in accordance with the present invention, I have found that high frequency waves may be used to transfer energy to expandable polymeric materials in such manner that the electrical energy is immediately converted to thermal energy. The heat produced results in an almost instantaneous expansion of the polymeric material to produce the desired integral, cellular, low density structure having small and uniform voids.

Known previous attempts to make foam from expandable polymeric materials by the use of high frequency waves have failed because such materials do not readily accept high frequency energy, but I have discovered that the polymeric materials of the present invention may be rendered suitable for dielectric heating by the employment therewith of a molding material having a high power loss factor material, e.g. one having a power loss factor of at least about that of water so that when the treated materials are placed in a field of high frequency waves, the high loss factor material absorbs sufficient energy to heat by molecular friction. The thermal energy thereby produced is transferred to the expandable polymeric materials to cause the effective foaming thereof.

By the herein disclosed technique, I am able to form or cast-in-place within a mold cavity by the fusing of the styrene pellets through the use of the radio frequency technique, to the complete elimination of steam, unless same is used in the pre-expansion step, when and where employed, wherefor, the need for the large capacity boilers, requisite for the generation of steam sufficient for fully expanding the pellets in the forming of the end product, together with the necessary piping and valving, not to mention the employment of the requisite stationary engineer, are obviated.

As has been stated, a normal first step in resinous material processing is the pre-expanding of the beads in a steam tank. The very introduction of steam implies a condensate, and as is well known, moisture is anathema to successful molding. The desideratum, in the prior art practice, is to remove such deposited moisture during the storage period following pre-expanding, said storage period being necessary for the equalization of internal gas pressures resulting from the loss of the propellent content during pre-expanding. Such storage period may vary from six hours to six days as a function of density and propellent content, which problem is totally overcome in the instant invention. This requisite step of allowing the beads to aspirate is, according to this invention, no longer necessary and the beads may now be employed immediately following their preparation for use.

Electronic heating, with its rapid cycling, is especially adapted for polystyrene, the thermal conductivity of which is extremely low, and the thickness of the average foam construction being of such magnitude as to lend itself well to the penetration of the radio waves. Uniform heating through the mass is permitted and the fabrication of cheap plastic molds becomes possible.

Despite this plurality of favorable factors, including the outstanding features that electronic heating is obviously cleaner and drier and cheaper, a practical method of electronic polystyrene foam molding has presented many problems which years of research in many laboratories do not seem to have been heretofore solved.

Polystyrene being transparent to radio frequency heat, it is requisite to add a moisture content to the granules of the resinous material so that they will be rendered receptive to said heat. The moisture will pick up the RF heat and it, in turn, will evolve into the steam to produce the desired foaming function.

As aforesaid, I have determined that water alone is not a satisfactory medium for covering all surfaces of all beads, a wetting agent being necessary to be added in order to insure proper coverage.

Otherwise, difficulties have been experienced heretofore in the employment of radio frequency heat in the expanding of styrene beads. First, no mold has been found which was of a non-conductive material and yet was of sufficient strength that its parts could be clamped together so as to sustain the created pressures. Heretofore, most molds have been made of aluminum. Secondly, the cooling of a non-conductive mold is an exceedingly slow process. Thirdly, the crumbling problem heretofore experienced by others who have experimented with such heat has been an exasperating one. It has been difficult, if not impossible heretofore, to obtain fusion at the outer edges wherefore crumbling of said outer layers has been encountered. This has been due to the difficulty in bringing any non-conductive mold up to a desired heat level.

The mold, for employment in a radio frequency system, should: be thin enough to afford quick heat transfer and yet thick enough to be mechanically strong so as to restrain bead gas pressure; be of low dielectric loss on all vertical surfaces with a low dielectric constant; have a high dielectric loss on all horizontal surfaces with a high dielectric constant (a palpable anomaly for the same mold material); be easily fabricated or cast; have a heat distortion temperature of over 200° F.; have a low coefficient of linear expansion; be easily machineable or otherwise workable; be arc resistant; be usable for thousands of cycles; be resistant to chemical additives used on the beads and non-adhering to the polystyrene; and be adherable to suitable reinforcing materials. Most important of all, the innermost or cavity defining surfaces of the mold, which come into intimate and direct contact with the beads, must have the capacity to come up to molding temperatures with a minimum of time and effort.

It was initially thought to be impossible to achieve even a reasonable compromise on such stringent qualifications. However, in this invention, I provide a novel mold construction which is made of a non-conductive material, which is of a rigidity so as to be self-sustaining and to withstand the pressures evolved in the expanding process, which is of a design and configuration as to be clamped to other structures, and which has a capacity for being automatically loaded and unloaded.

Other objectives and features of the present invention will become apparent from the following detailed description of the invention, throughout which description reference will be made to the accompanying drawings wherein:

FIG. 2 is a perspective view of a male stone-lined mold member made according to the invention;

FIG. 3 is a perspective view of a type of foamed polystyrene article which is readily obtainable with the molds of FIGS. 2 and 4;

FIG. 4 is a perspective view of a female stone-lined mold member made according to the invention;

FIG. 5 is a greatly enlarged sectional view taken on the line 5—5 of FIG. 4;

FIG. 9 is a perspective view of a blank form of another type of covering member before insertion into the mold;

FIG. 10 is a perspective view of the molded article made according to the system illustrated in FIG. 6 and showing the covering member of FIG. 9 in association therewith;

FIG. 11 is a perspective view of a blank form of still another type of covering member before insertion into the mold;

FIG. 12 is a perspective view of the molded article made according to the system illustrated in FIG. 6 and showing the covering member of FIG. 11 in association therewith;

FIG. 11 is a perspective of the molded article made according to the system illustrated in FIG. 6 and showing the covering member of FIG. 15 in association therewith;

Figure 1:
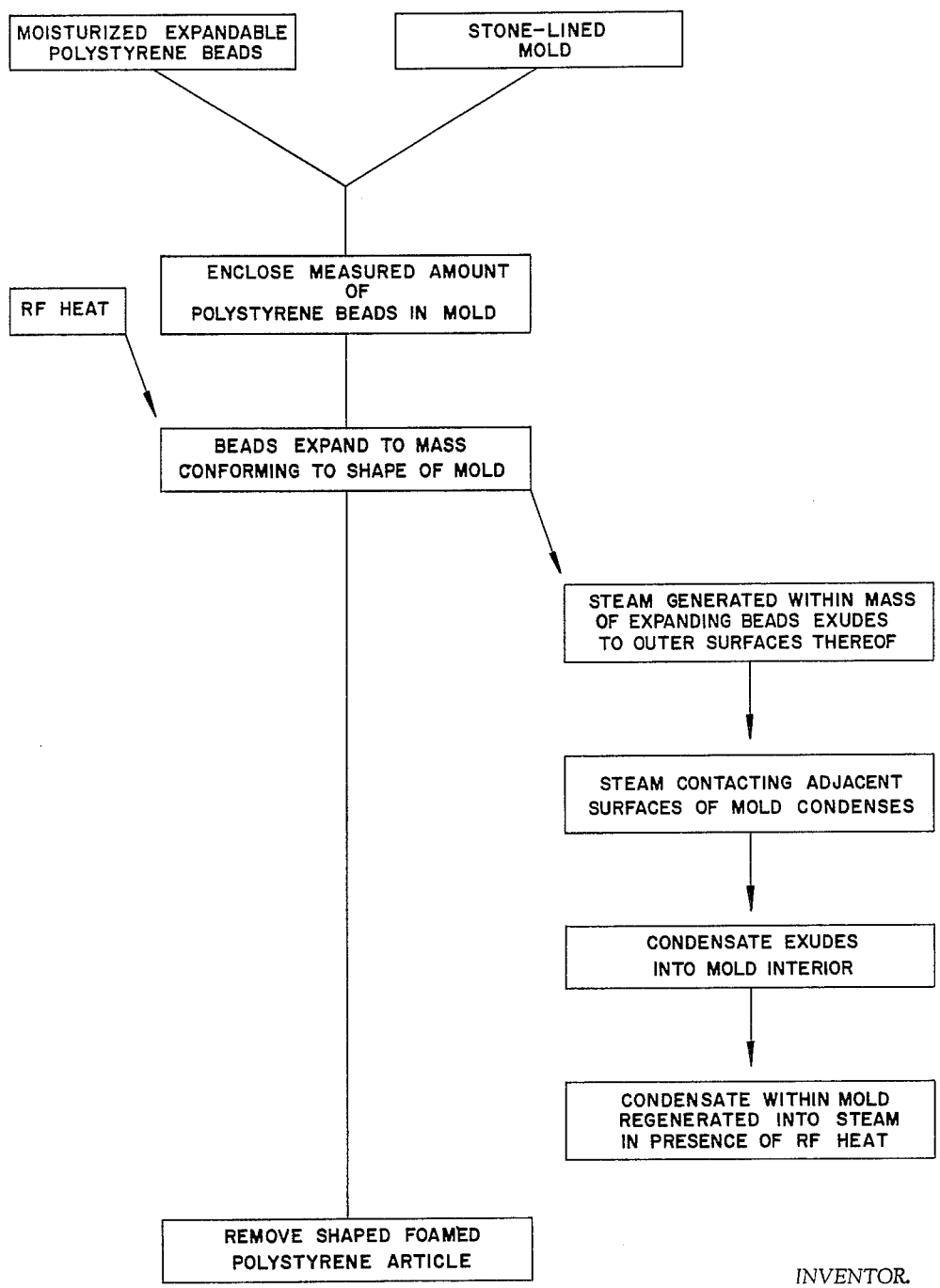
FIG. 1 is a flow sheet illustrating the novel method of the invention for filling a mold to produce the foamed polystyrene article.
Figure 6:
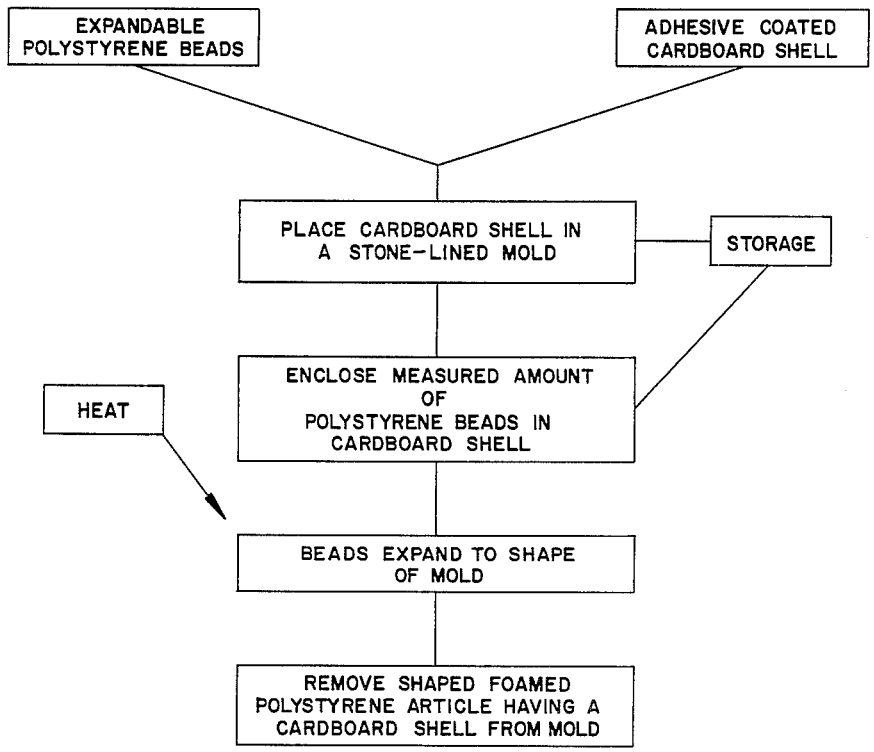
FIG. 6 is a flow sheet illustrating a modification of the method of the invention for filling a mold to produce a composite article comprising the foamed polystyrene body with an outer covering member on certain outer surfaces thereof.

Initially, the process of forming the mold of the invention, by which its formed articles may be molded into shape, will be explained, in order that the invention may be followed in logical sequence.

The preparation of the formed articles of my invention may advantageously be accomplished by employing a reinforcing or male mold, such as is generally shown by numeral 10 in FIG. 2, and/or a retaining or female mold, such as is generally shown by numeral 20 in FIG. 4, the two cooperating to define a thermoplastic foam-confining mold form of such structural design as to resist or preclude any dimensional change therein during their use through the heat generated during the foaming of the mass or masses contained within the mold cavity which they cooperatively define.

The reinforcing or male mold 10 may advantageously be made by taking the part to be duplicated, herein called the original part or "the customer's part" and using same as a guide for the formation of a mold therearound. The original part is provided (for illustrative purposes, a revolver is contemplated in the form shown in FIG. 2) by a vacuum forming process, with a sheating of thermoplastic thereover. Upon this sheathing is provided a facing 12 of a stone type material, such as cement, or concrete, fire clay, high-temperature plaster of Paris, or suitable refractory material, same being applied as by spraying or other equivalent means so as to be unitary therewith, the thickness of said facing being varied between molds to suit the requirements of individual use.

Alternating layers of a glass fiber 14 and a polyester or epoxy resin 16 may be sprayed or otherwise placed in seriatim over said stone-facing 12 so as to give a desired thickness as may be determined by the pressure which said mold will be expected to withstand during the expanding process in operational use.

The spraying may be by a spray device of the double nozzle type, with one nozzle spraying fiber glass, and the other nozzle spraying a polyester resin and an appropriate catalyst. The sprays from the two nozzles will join before reaching the stone-facing wherefore an intermingled mass of this material may be built to any desired thickness. By this simple method, the molds of the invention may be fabricated more economically and with greater speed.

Following such mold fabrication, the initial thermoplastic sheathing will be removed, leaving the stone face 12 exposed on all sides or faces of the formed mold.

The female mold 20 may be formed in similar manner about a form of suitable dimensions so as to produce a desired configuration. For example, the female mold of FIG. 4 may be fabricated by sheathing a box form with thermoplastic thereover. Upon the outer, non-cavity side of this sheathing, the inner facing of cement 12 and the alternating layers of glass fiber 14 and polyester or expoxy resin 16 may be provided.

Following fabrication of the mold 20, the thermoplastic sheet will be removed, leaving the stone face exposed on all sides or faces of the formed cavity.

Alternatively, and in lieu of the thermoplastic sheathing as described above, a release agent may be covered over the original part and the stone facing may be placed thereover, with the alternating layers of glass fiber and polyester of epoxy resin placed thereover, as aforesaid. Upon formation, the release agent may be easily removed therefrom.

As will appear, the mold hereof comprehends a stone type inner facing having a porosity for absorbing moisture. Recognizing that while the stone face per se might not heat sufficiently within the allotted time interval in a radio frequency field, it is to be appreciated that any moisture within the stone face will, wherefore a desired temperature buildup within a mold cavity may be obtained.

The stone-like facing of the completed mold component will be observed to be of a foraminated or porous nature having minute interstices through which water may pass so as to offer a capability for accepting the moisture and for releasing same in the form of steam when placed in an RF field so as to provide the required surface temperature.

The real heart of the invention lies in the fact that the hot steam exuded from the expanding foam mass is condensed when it strikes the relatively cooler facing of the mold and is also absorbed by the porous wall thereof so as to creep into the facing interior. The mold being within the RF field, the condensate is regenerated into steam so as to provide a temperature at the facing surface which provides the required temperature thereat so as to obviate the objectionable crumbling effect.

A synergistic effect is thus obtained by the cooperative action of the discrete agencies, namely, the steam within the expanding foaming mass and the condensate within the stone-like facing of the mold in such manner that the total effect is greater than the sum of the two effects taken independently of each other.

It is envisioned that other materials or techniques could be employed to form a foraminous layer equivalent to the stone type facing herein described.

In each instance, the foraminous facing will be characterized by its ability to absorb the condensate formed on the cool foraminous mold wall by the escaping steam internally generated. Said absorbed moisture, being in an RF field, is regenerated into steam instantaneously and then escapes to the atmosphere through the mold parting line.

In this process of condensing and regenerating, the mold wall is heated sufficiently so that the plastic particles will be fully fused together on the outer side as well as the internal portions.

In one sense, the process may be likened to a valve for regulating the escape of the steam, thus insuring sufficient mold temperature for thorough fusion.

With reference to FIG. 3, there is shown a form of foamaceous end product generally indicated by 22 formed by molds of the type shown in FIGS. 2 and 4, and comprising a porous, foamed body 24 and having a depression 26 in its upper planar surface conforming to the configuration of the article desired to be packed therein as determined by the male mold member employed in its formation.

FIG. 5 is a greatly enlarged transverse sectional view taken through one of the walls of the mold 20 of FIG. 4 and illustrates the arrangement of the various layers of material. It will be understood that the mold 10 of FIG. 2 will present the same appearance in its cross-section.

It is necessary to construct the mold in such a manner as to avoid any interference with the dielectric field during operational use. For this reason, the mold which is placed directly in the high frequency field must be made of and supported by an electrically insulated material. Such material must either be capable of receiving current from the electrodes and in turn serving as an electrode, or not subject to appreciable dielectric heating.

It should here be mentioned that in the conventional method of injecting steam into the cavity of an aluminum mold, the customer could not obtain a sample of his molded part until following the completion of the mold, same sometimes consuming eight or twelve weeks. By the method hereof, a finished part can be obtained in a matter of a relatively few hours.

I may also provide a wooden run or frame, much in the manner of a picture frame which may be disposed around the outer edge of the formed confining mold, so as to give strength to the outer edges for the clamping together of the confrontable mold parts and holding same tightly in their confronting relation.

All of the mold materials, it will be appreciated, are utilized with the dielectric process borne fully in mind and are, of necessity, selected as a function of the formulation of the thermoplastic material to be disposed therein and the part to be molded therewith.

As aforesaid, I determine the shape and configuration of the male mold by the use of the actual article to be packaged.

In the conventional method, the "customer's part" is normally used as a guide for the production of a duplicate or replica or pattern, sometimes called a "master," which master is then disposed in sand or cement or plaster of Paris so as to allow for the formation of an impression into which molten aluminum or the like may be poured for the making of the mold part. Such a time consuming and costly procedure is departed from herein and a shorter method of mold making is substituted therefor, especially advantageous in the case of short run items and/or where mold costs cannot be satisfactorily amortized, with the cost of producing same being approximately one-tenth or one-twentieth as much as in the case of the aforementioned conventional methods, thus allowing the use of the resinous material by persons and/or entities heretofore not able to afford the luxury of such use.

The mold having the expandable polymeric material disposed in the cavity thereof is passed through a field of high frequency waves generated in the well known manner, thereby causing a dielectric heating of the high power loss factor covering expandable polymeric particles. There is a concomitant expansion of the particles into an integral cellular structure which forms the body. The mold containing the cellular structure is thereafter cooled to cause the plastic to become rigid, thereby forming the desired body. Cooling may be accomplished by natural or artificial means.

In a further embodiment this invention is concerned with a modification of the technique described hereabove in which the opposed surfaces of a facing material are coated with an adhesive to provide adherence between the cellular polymeric structure and the facing material.

The stone type facing of the mold of the present invention permits the generated steam to seep or to be driven out of the mass and into the stone. The stone itself will not heat but, being in the RF field, the moisture that seeps into the stone does have a heating effect, wherefore excellent fusion is obtained throughout the entire block, including all side-walls thereof.

As the mold is opened and closed, and as the formed parts are ejected, some of the moisture in the stone is lost so that the stone starts to dry out.

On the subsequent charge, the steam from the wet beads reenters the stone facing so that the moistening cycle is repeated.

The wall thickness of the protective body and the physical properties of the cellular plastic may be selected to offer or afford the required degree of protection of the material or object. The frangible nature of the object or article or material and its intended mode of transportation, storage, and the like will thus determine the thickness, flexibility, etc. of the sheath.

Figure 8:
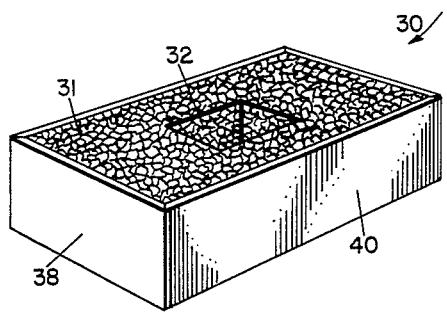
FIG. 8 is a perspective view of a composite molded article made according to the system illustrated in FIG. 6 and showing the covering member of FIG. 7 in association therewith.
Figure 7:
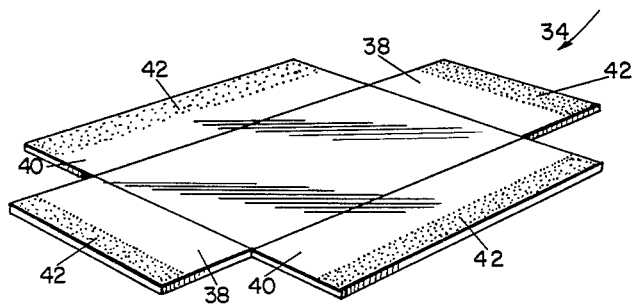
FIG. 7 is a perspective view of a type of blank form of a covering member before insertion into the mold in the foam molding procedure of the invention defined in FIG. 6.

With reference now to FIGS. 7 and 8, there is shown a modified form of foamaceous end product, generally indicated by 30 and comprising a porous foamed interior body 31 enveloped within an outer covering or skin layer, and having a depression 32 in its upper planar surface conforming to the configuration of the article desired to be packed therein as determined by the male mold member employed in its formation.

In this instance, a blank of the type, identified as a carton blank, and generally indicated in FIG. 7 by numeral 34 with a bottom panel 36, spaced opposite end panels 38 and 38, and spaced opposite side panels 40 and 40, and with the inwardly facing walls of the end and side panels being provided with an activatable heat sealing medium or adhesive 42, is disposed into the cavity of the mold and the beads are discharged thereinto.

While the blank 34 will be described as being formed of cardboard, it will be understood that the blank may be of equivalent material, such as paper or wood.

It is requisite that the blank be inert to the thermoplastic resinous material being foamed and disclose no capacity for entering into a chemical or physical reaction therewith so as to effectuate any degradation or decomposition or otherwise altering of any of the essential characteristics of either the blank or the resinous material except as to be, through the employment of the adhesive material, physically reactive with the thermoplastic resinous material to the extent that the one may be physically bonded to the other under the plastifying influence of the heat generated to effect the increase in the volume of the expanding mass of thermoplastic resinous material which serves the secondary function of activating the said adhesive.

It is particularly advantageous that the paper be treated with a coating of an adhesive material which will react so as to have an adhesive effect upon the expanded thermoplastic resinous material for the formation of the molded articles hereof as same will serve to reinforce the entire foam structure and produce a composite article of unique sturdiness and high strength in view of the production of a retaining skin over any outermost incompletely foamed granules of the expandable thermoplastic resinous material when it is foamed to a molded structure in manner whereby the paper component bonds and tightly laminates the molded foam to the integral mold form.

Various adhesives can be used herein. For example, a conventional starch adhesive or, optionally, one modified with a urea-formaldehyde or resorcinol-formaldehyde resin to enhance water resistance is suitable. Alternatively, such adhesives as sodium silicate, polyvinyl alcohol, asphalt (molten or in an emulsion), resorcinol-formaldehyde resins, phenol-modified resorcinol-formaldehyde resins, polystyrene latices, and the like can be used. Generally speaking, elastomeric-type adhesives are suitable.

Upon disposition into the mold cavity, the side and end panels of the blank are caused to assume an erected position.

The bottom panel 36, end panels 38, and side panels 40 will be forced into contact with the respective of the relatively cool inner surfaces of the mold by the rapid expansion of the inner foaming granules and will function as an exothermus material or skin so as to advantageously provide a sandwich construction for the formed article.

Packaging articles of this type may find advantageous application for such use, by way of example, as a package wherein it may be desirable to have a plastic interior and a cardboard sheathed exterior in a strong, rigid, well insulated construction.

Herewith, it is now possible to employ the premoistened pellets, charging same into the said mold of the invention, and passing the mold and its charge through an RF field.

In the prior art constructions, moisture condenses on the mold wall or escapes through the mold parting line as the pressure of expanding granules builds up so that the side walls of the mold are not sufficiently heated wherefore the molded article is imperfectly fused at its outer perimeter.

Herein, the steam generated within the mold seeps into the stone-facing due to the porosity thereof and is trapped therein to build up the mold wall temperature.

The pressure of the expanding mass and the adhesive action on the reacted innermost faces of the cardboard coupled with the heat from the stone-facing results in a strong lamination between the cardboard and foam to provide a useful packaging container, the cardboard thus becoming an integral part of the article by the adhesive action of the reacted resin of the exothermus cardboard material.

Such an article may be made to have great strength and rigidity, even though relatively thin cardboard panels are employed, due to the structural reinforcement which is provided by the contained foam stucture.

It will be readily apparent that such a procedure may also be followed wherein blanked woodboard or cardboard or other forms of non-conductive material are provided in previously erected condition.

It will be understood that such outer covering or shell of cardboard, wood or the like may be preferred, especially where the customer desires a printing or surface decoration on the container, it not being practicable to print or decorate the foam per se.

When the mold has intricate configurations with deep draws, it may be advantageous to form the blank so that it is more or less shaped to the contour of the part to be molded before it is filled with beads and before it is inserted into the final mold.

Heretofore, it has been procedure to discharge the foamable or expandable polymeric material into the mold or to fill the mold by using a venturi and compressed air to blow the particles of polymeric material into special openings in the mold. These practices made quality control difficult because of lack of knowledge of the exact quantity of polymeric material in the mold or of lodging of the particle to form holes known as "blow holes." In accordance with this invention, the proper quantity of particles of expandable polymeric material can be delivered to the molding equipment in erected blanks which are of the proper material and which have the proper peripheral dimensions. This packaging of the expandable polymeric material eliminates the need for care in filling the mold and for special handling and labor that goes into the filling of the mold at the point of molding and insures a uniformly high quality of product; through the use of this invention, the package of expandable polymeric material can be placed directly in the mold.

In this invention, and as a key feature thereof, I thus provide the system of employing within the mold cavity a cardboard blank which preferentially, though not obligatorily, will have been preprinted or precolored on what will subsequently serve as thin outermost surfaces for the optimum presentation of the formed product.

The opposite or inside surface of the die cut cardboard may be treated with an adhesive material by means of a roller coating machine or the like. The precoated die cut material may be perforated and then stacked to be used in seriatim within the molding machine, no blocking or separating medium between successive die cuts being necessary as the adhesive desirably will be of a fast drying type.

The cardboard is placed into the mold whereupon the mold is closed and the pellets are blown thereinto.

As the mold is passed through the RF field, heat is generated so as simultaneously to create a pressure as the pellets expand and bond to each other and to reactivate the adhesive so that the adjacent expanded cells are bonded thereto.

The sheath may be directly bonded to the box or container in which it is cast so that the sheath and covering, in effect, form a uniform supporting and protecting enclosure for the object or material.

As an alternative procedure, a previously set up box may be employed, the inner walls of which may or may not be provided with a coating of adhesive, as desired, depending upon whether, in the ultimate product, a box with the foamed material adhering to the inner walls was or was not desired. Otherwise the foamed insert could be so formed as to lay loosely within the box, the mass being molded so as to conform to the specific configurations of the box, yet not adhering to the box itself.

In FIG. 9, I have illustrated a carton blank, generally indicated by 50, and comprising a bottom panel 52, spaced opposite end panels 54 and 54, spaced opposite side panels 56 and 56, and a corner glue tab 58 at each corner of the blank, articulated to the adjacent end of the respective side panel 56, said glue tab having a heat sealing medium 59 coated upon the inner surface thereof.

When the carton blank is placed into the mold cavity, the carton will be caused to be erected wherefore each said glue tab is disposed adjacent its respective end panel with the inner adhesive coated surface of the glue tab being placed in juxtaposition to the respective end panel.

Under the influence of the RF heat during the foaming process, certain components of the carton blank will be caused to adhere to each other with no concomitant sealing engagement between carton blank and foamed body to form the end product illustrated in FIG. 10 and indicated generally by 60 wherein the foamed body 62 may be releasably removed from its outer covering.

In FIG. 11, I have illustrated a carton blank, generally indicated by 70, and comprising a bottom panel 72, spaced opposite end panels 74 and 74, spaced opposite side panels 76 and 76, and a corner glue tab 78 having a heat sealing medium coated upon the inner surface thereof at each corner of the blank articulated to the adjacent ends of both of the respective side and end panels and being scored with a diagonal score line 78' to facilitate folding inwardly upon erection.

When the carton blank is placed into the mold cavity, the carton will be caused to be erected wherefor each said glue tab is folded at the score line 78' so as to extend inwardly so that as the beads expand, the foamed body 82 is caused to embrace both sides of the glue tabs in an enclosing manner wherefor the resultant end product, generally indicated by 80 in FIG. 12 is obtained and is illustrative of a sandwich form of container produced by foaming a mass to a foam structure confined between spaced tightly adhering sheets of a cardboard material which are retained as an integral part of the composite article by the bond which is obtained by reason of the adhesive properties of the glue tabs of the reacted cardboard.

Figure 13:
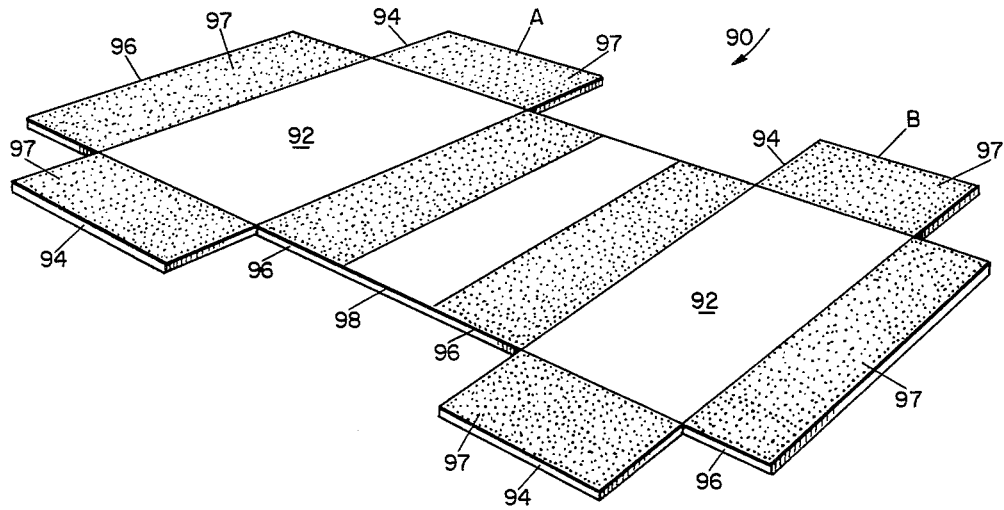
FIG. 13 is a perspective view of a blank of still another type of covering member before insertion into the mold.

In FIG. 13, I have illustrated a double carton blank, generally indicated by 90, and comprising identical carton blanks A and B connected by a hinge panel, as will appear. Each of the blanks A and B will comprise a bottom panel 92, spaced opposite end panels 94 and 94, and spaced opposite side panels 96 and 96, and with the inwardly facing walls of the end and side panels being provided with an activatable heat sealing medium or adhesive 97. The edges of adjacent side panels 96 of the blanks A and B will be joined by a longitudinally-extending hinge panel 98 for purposes as will be observed.

Figure 14:
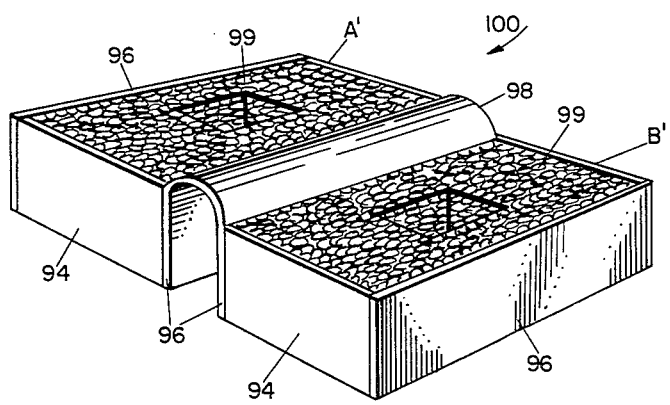
FIG. 14 is a perspective view of the molded article made according to the system illustrated in FIG. 6 and showing the covering member of FIG. 13 in association therewith.

The double carton blank will be placed in a mold cavity having means to engage the hinge panel 98 at the longitudinal center line thereof to cause the side panels connected thereto to be erected wherefore a pair of interconnected cartons A' and B' are produced to enclose the foamed body 99 forming the resultant end product generally indicated by 100 in FIG. 14. The end product of FIG. 14 is, in effect, a container having a cover hingedly connected thereto. It will be obvious that such a construction will be highly desirable in those instances wherein a container having a cover integral therewith is desired.

Figure 15:
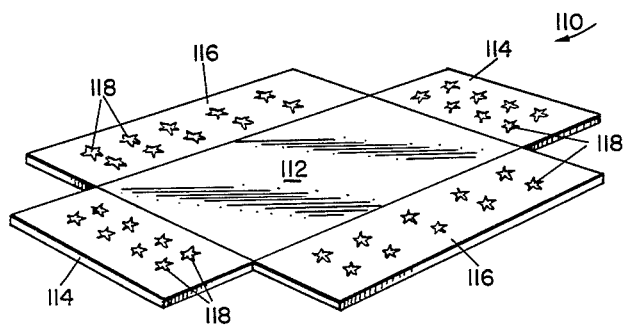
FIG. 15 is a perspective view of a blank of still another type of covering member before insertion into the mold.

In FIG. 15 there is shown a blank generally indicated by 110, with a bottom panel 112, spaced opposite end panels 114 and 114, and spaced opposite side panels 116 and 116. Both the side and end panels will be provided with a plurality of star-shaped apertures 118 therethrough.

Figure 16:
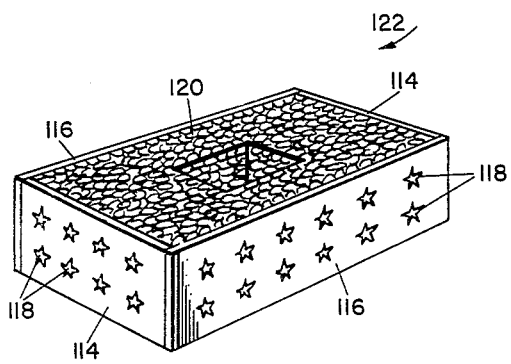

When the carton blank is placed into the mold cavity, the carton will be caused to be erected. Pre-expanded beads will be charged into the cavity to produce the foamed body 120 and the resultant end product, generally indicated by 122 in FIG. 16.

Figure 17:
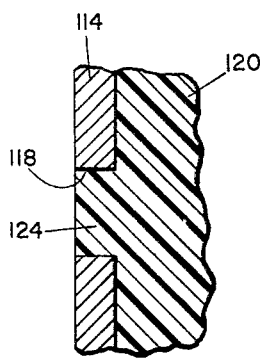
FIG. 17 is a greatly enlarged fragmentary sectional view through one of the openings through the covering member and through the body of the molded article shown in FIG. 16.

Referring to FIG. 17, wherein is shown an enlarged sectional view taken through one of the panels and apertures of the blank, it will be observed that the foamaceous body 120 adjacent the aperture 118 has extended into the aperture to form a tongue 124 engaging the walls of the aperture and adapted to effect an interlocking between the carton and the foamaceous body.

It will of course be obvious that the star-shaped apertures serve a decorative function to produce a more attractive display container. These apertures may be formed in a variety of shapes as crescents, diamonds, hearts or the like as desired.

The apertures 118 will serve the additional function of facilitating the passage of moisture into the stone-facing of the mold during the molding cycle.

Additionally, the blank 110 of FIG. 15 may be pin pricked to provide a plurality of minute openings to aid in this passage of moisture into the stone-facing, as may also the blanks shown in FIGS. 7, 9, 11 and 13.

Figure 18:
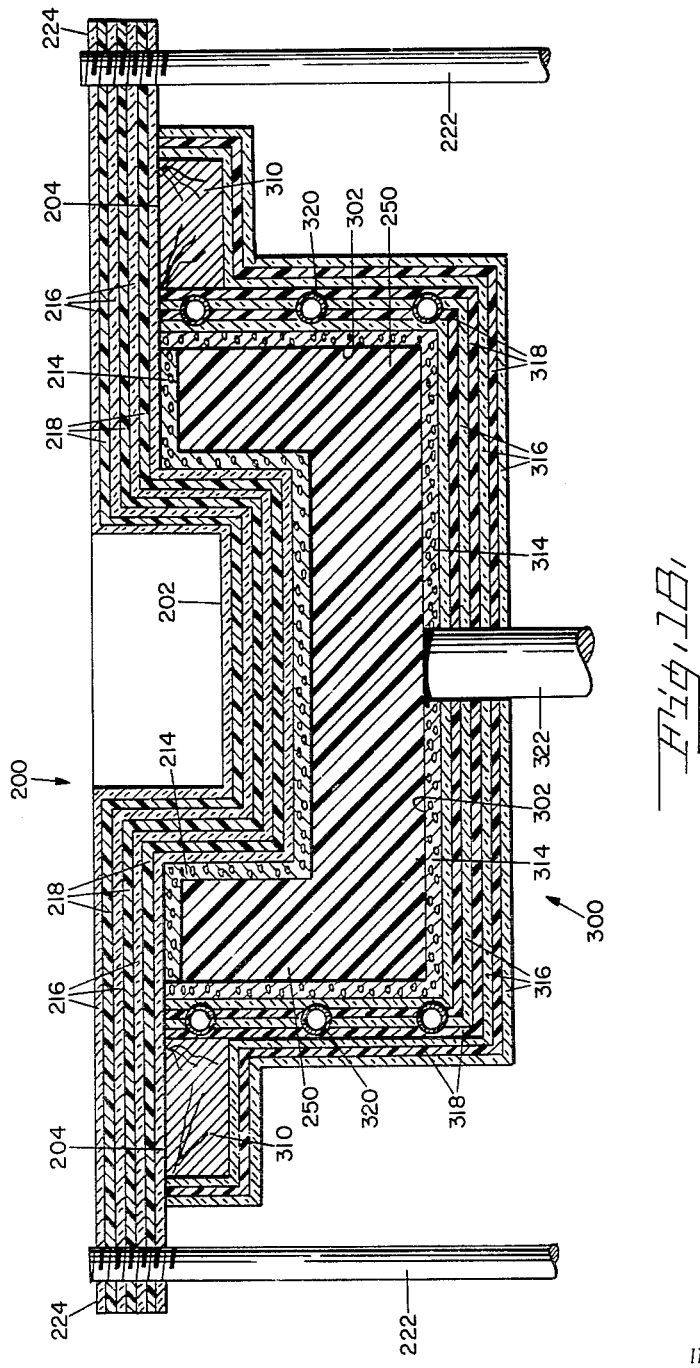
FIG. 18 is a transverse sectional view of a mold and foamed article therein, the mold being shown in the closed position.

In FIG. 18 is illustrated a typical mold embodying the novel features of the invention. Herein I have shown an upper or male mold 200 and a lower or female mold 300.

The female mold 300 will be provided with a cavity 302 therein, while the male mold will be provided with a die 202 receivable in said cavity, with said molds being separable at a horizontal parting line 204, as is known.

The lower mold 300 will be enclosed by a generally rectangular wood frame 310 to strengthen the construction, and will comprise an inner stone-facing 314 and alternating layers of fiberglass 316 and polyester resin or epoxy resin 318 built up thereupon. The layer of fiberglass disposed adjacent the stone-facing may have coolant tubing 320 disposed therein, if desired.

A filler plug 322 will extend vertically through the lower mold and will have its upper end communicating with the cavity 302 in said lower mold.

The upper mold 200 will be constructed in a similar manner and will comprise an innermost stone facing 214, with said stone facing having alternating layers of fiberglass 216 epoxy resin 218 built up thereon.

Rods 222 will be fixed to a peripheral flange 224 provided on said upper mold and, when actuated by suitable means, not shown, will serve to either clamp the upper mold in molding position or to raise it therefrom.

In the cavity 302 will be disposed a self-expanding mass 250 comprised of polystyrene which will be subjected to an RF field to cause the generation of heat and moisture to fuse the mass.

The moisture so generated will seep into the porous stone facings of both the upper and lower molds wherefore these walls are heated to insure the proper fusion of the granules adjacent thereto.

In effect, the stone facings perform the function of cooking on the surface to insure proper fusion thereat.

In the fabrication of the lower mold member 300, provision will be made for suitable ejection means in the form of pins, not shown, wherefore the article formed within the cavity 302 may be ejected therefrom. The lower mold member may be suitably apertured as by boring or the like for receipt of these pins.

The openings provided will be countersunk wherefore the heads of the ejector pins will be flush with the inner planar face of the stone facing 314.

I have indicated that time is of paramount importance in the preparation of polymeric foams and polymeric structural material. The heating time, or the time in which the expandable polymeric material is exposed to high frequency waves, depends upon the temperature required for foam formation and the rate at which that temperature is reached for a given material. To make the polymeric foam, the expandable material must be heated at least to a temperature range wherein softening of the polymer occurs. To avoid charring, the polymeric foam must be removed from the high frequency field before overheating occurs.

The upper and lower temperature limits will vary with the choice of polymeric material. For example, when expandable polystyrene is heated, a temperature of from about 100 to 125° C. must be attained to cause expansion and softening of the polymeric particles. Generally speaking, with regard to the upper limit, the polymeric foams should be removed from the high frequency field before a temperature of about 135–150° C. is reached.

The required temperature also varies with the density of the expandable polymeric material. For instance, when expandable polystyrene having a density of 2 lbs. per cubic foot is heated, a temperature of about 110° C. is sufficient to soften the polymer and promote expansion. If the density of the material is decreased to about 1 lb. per cubic foot, a temperature of about 120° C. is required.

For control purposes, the temperature may be physically measured during the dielectric heating step provided, however, that the thermometer is preheated and is placed in contact with the expandable polymeric material in a manner avoiding any interference with the high frequency field.

The temperature to which the treated polymeric material is heated in a high frequency field ultimately depends upon the power absorbed per unit volume of material. In turn, the power absorbed is dependent on the power loss factor of the material to be heated, the voltage applied and the frequency of the wave generated by particular equipment. A frequency of about 5 to 100 megacycles per second is suitable for purposes of the present invention.

The spacing of the electrodes of the high frequency equipment affects the temperature and the rate of heating. This effect can be offset by varying the frequency or the voltage.

If the expandable polymeric material is placed in molds and/or is interposed between facing materials, the temperature and rate of heating of the expandable material in the high frequency field will depend to some extent upon the thickness and power loss factor of the mold and/or facing material.

Molds of various shapes can be used to contain the expandable polymeric material as it is being heated in the high frequency field. Thus, shaped articles including children's toys, cups, dishes and the like are produced in a quick and efficient manner. The mold used should be made of a low loss factor material to avoid dissipation of the high frequency energy therein. For example such materials as wood, glass, quarts, ceramics, polymethacrylates, Teflon, polyester-impregnated glass fibers, silicone-impregnated glass fibers and the like are quite suitable.

Continuous boards or sheets of polymeric foam produced in this apparatus have self-sealing surfaces, thus obviating the use of facing materials in certain application.

The high frequency generating unit (not shown) will be of a conventional type and will normally comprise three sections: (1) a power supply section, (2) a high frequency generating section, and (3) a control section. The power supply section receives alternating current of low voltage from a source (not shown), and it rectifies and transforms this current to high voltage current. The high frequency generating section receives the high voltage current and generates high frequency power. The control section regulates the operation of the other two sections. The high frequency field is generated between a hot electrode and a ground electrode. The spacing between the electrodes is regulated by an electrically insulated screw adjuster. The supporting members are movable so that the thickness of the polymeric material passing through the high frequency field can be regulated.

I claim:

A molding method to provide a shaped molded foam article comprising the steps, charging a moisturized expandable granular thermoplastic resinous material into a cavity of a substantially impervious mold having a unitary porous water-absorbent facing and formed to provide the desired shape of the foamed article in an amount corresponding to the amount necessary to completely fill the mold cavity upon granule expansion, subjecting said mold and its contents to RF heat for generating steam from the moisture of the granular material effecting the softening and expanding and fusing together of the granular material into a shape conforming to the cavity configuration, forcing the generated steam to flow under pressure to the cavity wall for condensation upon contact therewith and absorption thereby to the preclusion of premature escape of steam to atmosphere, regenerating the condensate into steam under the influence of the RF heat for the supplemental heating of the cavity wall and the augmentation of the fusion of the adjacent granular material, and thereafter removing from the cavity of the mold a shaped article conforming to the cavity shape and having a core of uniform foamed expanded resinous material encapsulated by an outermost uniform skin.

(Other references on following page)

References Cited by the Examiner

UNITED STATES PATENTS

| | | | |
|---|---|---|---|
| Re. 24,767 | 1/1960 | Simon et al. | 206—46 |
| 2,363,213 | 11/1944 | Wallace | 18—1947 |
| 2,488,446 | 11/1949 | Swiss | 18—1947 |
| 2,652,595 | 9/1953 | Kish | 18—47.5 |
| 2,662,248 | 12/1953 | Ames | 18—47.5 |
| 2,898,632 | 8/1959 | Irwin et al. | |
| 2,924,861 | 2/1960 | Viets. | |
| 2,962,407 | 11/1960 | Aykanian | 18—48 XR |
| 2,983,963 | 5/1961 | Jodell et al. | 18—59 |
| 2,989,783 | 6/1961 | Slapnik | 18—48 |
| 3,000,058 | 9/1961 | Thielen | 18—59 |
| 3,010,157 | 11/1961 | Cizek. | |
| 3,033,358 | 5/1962 | Mantell et al. | 260—46 |
| 3,042,973 | 7/1962 | Brockhues et al. | |
| 3,060,513 | 10/1962 | Klink et al. | |
| 3,137,743 | 6/1964 | Pelley | 264—47 XR |

OTHER REFERENCES

Modern Plastics, "New Techniques for Processing Expandable Styrene Foam: Dielectric Expansion," September 1960, pp. 113–115, 198, and 200.

Plastics World, "Foaming-Agent Impregnated Polystyrene Beads Expand in Heated Molds to Controllable Size, and Densities," March 1954, p. 4.

ALEXANDER H. BRODMERKEL, *Primary Examiner.*

WILLAM J. STEPHENSON, ROBERT F. WHITE,
*Examiners.*